United States Patent [19]

Lee et al.

[11] Patent Number: 4,555,529

[45] Date of Patent: Nov. 26, 1985

[54] FOAMABLE POLYORGANOSILOXANE COMPOSITIONS

[75] Inventors: Chi-Long Lee; Myron T. Maxson; James A. Rabe, all of Midland, Mich.

[73] Assignee: Dow Corning Corporation, Midland, Mich.

[21] Appl. No.: 747,217

[22] Filed: Jun. 21, 1985

Related U.S. Application Data

[62] Division of Ser. No. 715,807, Mar. 25, 1985.

[51] Int. Cl.$^4$ ................................................. C08J 9/14
[52] U.S. Cl. ........................................ 521/124; 521/93; 521/98; 521/131; 521/134; 521/154; 525/478; 528/15; 528/31; 528/32
[58] Field of Search ................... 521/93, 98, 124, 131, 521/134, 154

[56] References Cited

U.S. PATENT DOCUMENTS

| | | | |
|---|---|---|---|
| 4,026,842 | 5/1977 | Lee et al. | 521/154 |
| 4,026,844 | 5/1977 | Kittle et al. | 521/154 |
| 4,026,845 | 5/1977 | Kim et al. | 524/263 |
| 4,229,548 | 10/1980 | Sattlegger et al. | 521/154 |
| 4,368,279 | 1/1983 | Modic et al. | 521/74 |
| 4,418,157 | 11/1983 | Modic | 521/134 |

*Primary Examiner*—Morton Foelak
*Attorney, Agent, or Firm*—Robert Spector

[57] ABSTRACT

Polyorganosiloxane foams are prepared by the volatilization of a blowing agent within a polyorganosiloxane composition that is curable by a hydrosilation reaction and includes as a foam stabilizer a resinous polyorganosiloxane comprising trimethylsiloxy units, $SiO_{4/2}$ units and a specified class of fluorine-containing siloxane units.

15 Claims, No Drawings

FOAMABLE POLYORGANOSILOXANE COMPOSITIONS

BACKGROUND OF THE INVENTION

1. Field of the Invention

This invention relates to the preparation of polyorganosiloxane foams. More particularly, this invention relates to polyorganosiloxane compositions that are converted to useful cured foams when the ingredients of the composition, including a blowing agent, are combined and dispensed into an area under atmospheric pressure at temperature of about 0° C. or higher.

2. Background Information

A number of different methods for generating curable polyorganosiloxane foams are disclosed in the prior art. One of these methods employs the reaction of silicon-bonded hydrogen atoms with a source of hydroxyl groups such as water, alcohols or polyorganosiloxanes containing silicon-bonded hydroxyl groups. This reaction generates hydrogen gas that functions as the blowing agent. The use of internally generated hydrogen as a blowing agent for polyorganosiloxane foams is disclosed in U.S. Pat. No. 3,923,705, issued to Smith on Dec. 2, 1975, in U.S. Pat. No. 4,026,842, issued to Lee and Ronk on May 31, 1977 and in U.S. Pat. No. 4,026,844, issued to Kittle and Ronk on May 31, 1977.

Production of foams by stirring air or other gas into a curable polyorganosiloxane composition containing silicon-bonded vinyl radicals and silicon-bonded hydrogen atoms is disclosed in U.S. Pat. No. 4,368,279, issued to Modic and Boudreau, on Jan. 11, 1983. In accordance with the method described in this patent, the polyorganosiloxane composition is mixed in the presence of the gaseous blowing agent and then placed in a vacuum chamber and maintained under a vacuum of at least 600 mm of mercury until the foam cures sufficiently to become self-supporting, which requires at least five minutes. Patentees teach that collapse of the foam occurs in the absence of vacuum, and that their method is limited to producing foamed slab stock in a factory, and cannot be applied to producing foam in a conduit, between inner and outer structural walls or other locations where a foam is generated at the installation site.

The advantage of packaging in a single portable container all of the ingredients, including blowing agent required to produce a polyorganosiloxane foam has been recognized. U.S. Pat. No. 4,229,548, issued on Oct. 21, 1980 to Sattleger et al. discloses a 2-compartment aerosol type container for storing and dispensing a foamable polyorganosiloxane composition. The container consists of a flexible walled inner compartment containing a foamable, room temperature vulcanizable (RTV) composition that includes a hydroxyendblocked polydiorganosiloxane, a curing agent and, optionally, a gaseous blowing agent and an outer compartment containing a moisture free inert gas under a pressure of from 0.2 to 3.0 megapascals. The container is equipped with a valve through which the foamable composition is dispensed under the pressure of the gas confined in the outer compartment of the container. The formation of polyorganosiloxane foams by dispensing a one-part moisture curable RTV polyorganosiloxane composition stored under pressure in a 2-compartment container is also taught in German published application Nos. 2,909,443 and 2,911,971.

Foams produced by dispensing RTV polyorganosiloxane compositions, including a blowing agent and/or a propellant, from pressurized containers, such as aerosol cans, are typically of relatively poor quality and characterized by average cell sizes larger than 2 mm., densities from 0.48 to 0.81 g./cc and relatively low foam height due to drainage of uncured or partially cured liquid from the cellular structure of the foam during the curing process. The need to minimize collapse of partially cured foams by the use of vacuum, by heating to accelerate curing, by the addition of fillers or other means requiring additional processing steps may more than offset the advantages achieved by using foamable compositions packaged in portable pressurized containers such as aerosol cans.

Various additives have been used to reduce the density of polyorganosiloxane foams. One such additive is a resinous organosiloxane copolymer containing repeating units of the formulae $R_3SiO_{1/2}$ and $SiO_{4/2}$, where R represents alkyl, aryl, aralkyl, alkaryl, cycloalkyl, vinyl, allyl or fluoroalkyl and the molar ratio of $R_3SiO_{1/2}$ to $SiO_{4/2}$ units is from 0.25 to about 0.8:1. This type of additive is disclosed in U.S. Pat. No. 4,418,157, which issued to Modic on Nov. 29, 1983.

Kim, Lee and Ronk in U.S. Pat. No. 4,026,845, issued on May 31, 1977, teach the addition of fluorinated surfactants to reduce the density of foams generated by the hydrogen produced during the reaction of silicon-bonded hydroxyl groups with silicon-bonded hydrogen atoms in the presence of a platinum-containing catalyst. It has now been found that these fluorinated surfactants will not stabilize the cellular structure of partially cured polyorganosiloxane foams dispensed from pressurized containers in the absence of large amounts of solid fillers.

An objective of this invention is to provide foamable polyorganosiloxane compositions that are curable by a hydrosilation reaction, can be packaged in pressurized containers and when dispensed from these containers form useful foams. A second objective of this invention is to provide one-part foamable compositions that cure in the presence of microwave radiation.

SUMMARY OF THE INVENTION

It has now been found that the stability of uncured and partially cured foams prepared by volatilization of a blowing agent within a polyorganosiloxane composition that is curable by a hydrosilation reaction is substantially improved by including in said composition a resinous polyorganosiloxane comprising trimethylsiloxy units, $SiO_{4/2}$ units and a specified class of fluorine-containing siloxane units.

DETAILED DESCRIPTION OF THE INVENTION

This invention provides a foamable polyorganosiloxane composition exhibiting a viscosity of at least 0.5 Pa.s at 25° C., said composition consisting essentially of the product obtained by homogeneously blending together (A) a polydimethylsiloxane containing at least two vinyl radicals per molecule and exhibiting a viscosity of from 0.1 to 100 Pa.s at 25° C.; (B) an organohydrogensiloxane containing an average of at least 3 silicon-bonded hydrogen atoms per molecule in an amount sufficient to cure said composition in the presence of a hydrosilation catalyst, (C) a catalytically effective amount of a platinum- or rhodium-containing hydrosilation catalyst, (D) from 0.2 to 25%, based on the weight of said polyorganosiloxane composition, of a foam stabilizer consisting essentially of a resinous, benzene-soluble organosiloxane copolymer comprising $SiO_{4/2}$ units, $(CH_3)_3SiO_{1/2}$ units and fluorine-containing units selected from the group consisting of $R_aR'SiO_{(4-a-b)/2}$, $R''[Si(R')_bO_{(3-b)/2}]_2$ and combinations thereof, where R is a monovalent organic radical containing at least four perfluorinated carbon atoms, R' is an alkyl radical containing from 1 to 3 carbon atoms, R'' is a divalent organic radical containing at least four perfluorinated carbon atoms, R and R'' are bonded to the silicon atoms of their respective fluorine-containing units by means of a sequence of at least two methylene radicals or a silicon bonded oxygen atom that is, in turn, bonded to a sequence of at least two methylene radicals, a is 1 or 2, b is 0, 1 or 2 and the sum of a and b is 3 or less, the molar ratio of all units other than hydroxyl and said $SiO_{4/2}$ units to said $SiO_{4/2}$ units is from 0.7:1 to 1.1:1 inclusive, and the molar ratio of the $(CH_3)_3SiO_{1/2}$ units with respect to said fluorine-containing units and any remaining units other than said $SiO_{4/2}$ units is such that (a) the surface tension exhibited by a 10% weight percent solution of (D) in a trimethylsiloxy endblocked polydimethylsiloxane exhibiting a viscosity of 0.01 Pa.s at 25° C. is less than $2.2 \times 10^{-4}$ newtons per cm at 25° C., and (b) said 10% weight percent solution requires the addition of from 0 to 100 weight percent of xylene to achieve clarity at 25° C.; (E) an amount of a blowing agent sufficient to convert said composition to a foam when said composition is under atmospheric pressure at a temperature of at least 0° C.; (F) optionally, an amount of a catalyst inhibitor sufficient to deactivate said platinum-containing hydrosilation catalyst at temperatures up to 50° C.; and (G) optionally, an amount of a microwave sensitive material sufficient to generate the heat required to activate said hydrosilation catalyst in the presence of said inhibitor (F) and microwave radiation.

Polydimethylsiloxanes suitable for use as ingredient (A) of the present compositions contain at least two vinyl radicals per molecule and exhibit a viscosity of from 0.05 to 100 Pa.s at 25° C. Preferably the vinyl radicals are located at the terminal positions and the viscosity is from 0.1 to 50 Pa.s.

In addition to dimethylsiloxane units, (A) can include small amounts of trimethylsiloxy, monomethylsiloxane, methylvinylsiloxane and $SiO_{4/2}$ units that can result from impurities in the intermediates used to prepare (A). Typically these units constitute less than 0.5 percent by weight of (A). Ingredient (A) can also contain diorganosiloxane units containing hydrocarbon radicals or substituted hydrocarbon radicals other than methyl or vinyl, such as ethyl, propyl, 3,3,3-trifluoropropyl and/or phenyl, so long as these radicals do not interfere with the ability of the foam stabilizer to minimize collapse of the partially cured foam. Most preferably the terminal units of (A) are dimethylvinylsiloxy units, this preference being based on the availability of the corresponding intermediates and the reactivity of the vinyl group.

Ingredient (A) can be a monodisperse polydimethylsiloxane or a blend of two or more polydimethylsiloxanes of different molecular weight, and preferably constitutes from 40 to 85% by weight of the foamable composition.

The organohydrogensiloxane, referred to hereinafter as ingredient (B), reacts with the vinyl radicals of ingredient (A) to form a cured composition. Organohydrogensiloxanes containing at least 3 silicon-bonded hydrogen atoms per molecule and no more than one hydrogen per silicon atom are known materials, and are disclosed, for example, by Polmanteer et al. in U.S. Pat. No. 3,697,473, issued on Oct. 10, 1972 and in U.S. Pat. No. 3,989,668, issued on Nov. 2, 1976 to Lee et al. These patents are incorporated herein by reference as examples of known organohydrogensiloxanes. Ingredient (B) includes homopolymers, copolymers and mixtures thereof, and can contain repeating units of the formulae $R^*HSiO$, $R^*_2HSiO$, and/or $HSiO_{3/2}$ in addition to units of the formulae $R^*_3SiO$, $R^*_2SiO$, $R^*SiO_{3/2}$ and/or $SiO_{4/2}$. In these formulae $R^*$ represents a hydrocarbon or halohydrocarbon radical that does not contain ethylenic unsaturation. $R^*$ can be alkyl, haloalkyl, cycloalkyl, aryl, alkaryl or aralkyl. To ensure that the organohydrogensiloxane is compatible with ingredient (A), at least 80%, most preferably 100%, of the $R^*$ radicals are methyl.

Examples of preferred organohydrogensiloxanes include cyclic polymethylhydrogensiloxanes, copolymers containing dimethylsiloxane and methylhydrogensiloxane units and trimethylsiloxy endblocked polymethylhydrogensiloxanes. Ingredient (B) preferably contains from 0.5 to about 1.6 weight percent of silicon-bonded hydrogen atoms. Most preferably the organohydrogensiloxane contains an average of at least four silicon-bonded hydrogen atoms per molecule.

A second preferred type of organohydrogensiloxane is represented by the general formula $(HR_2^*SiO)_4Si$, wherein $R^*$ is as defined hereinabove. The species wherein $R^*$ represents methyl is particularly preferred because of the rapid reaction rate of this compound with ingredient (A). Using a more reactive organohydrogensiloxane is one method for minimizing the extent to which a foam collapses during curing.

Ingredient (B) is preferably a liquid to facilitate blending with ingredient (A). The concentration of ingredient (B) should be sufficient to provide from 1 to 3 silicon-bonded hydrogen atoms per silicon-bonded vinyl radical present in the foamable composition.

The hydrosilation reaction between ingredients (A) and (B) of the present foamable composition is catalyzed by a platinum- or rhodium-containing material referred to hereinafter as ingredient (C).

Any of the known platinum-containing hydrosilation catalysts will promote curing of foams prepared using the compositions of this invention. Many of these catalysts are active at temperatures of from 25 to 50° C. To minimize drainage of liquid from partially cured foams and the accompanying increase in foam density, the curing reaction should be as rapid as possible, particularly for those compositions exhibiting viscosities in the lower portion of the preferred range of from 0.5 to 100 Pa.s at 25° C. Catalysts yielding the most rapid curing rate at room temperature are complexes formed by reacting chloroplatinic acid with a vinyl-terminated polydiorganosiloxane of the general formula $(CH_2=CH)R_2'''Si[OSi(CH_3)(R''')]_x$-$OSiR_2'''(CH=CH_2)$ where each $R'''$ is individually selected from the group consisting of alkyl radicals containing from 1 to 4 carbon atoms, phenyl radicals and 3,3,3-trifluropropyl radicals and x is an integer from 1 to 6, inclusive. Catalysts of this type are described in U.S. Pat. No. 3,419,593, issued to Willing on Dec. 31, 1968 and is incorporated herein in its entirety by reference thereto.

The platinum containing catalyst is present in an amount sufficient to catalyze curing of the foamable composition at a sufficiently rapid rate that will minimize, if not eliminate, the drainage of liquid reactants and the resultant collapsing of the foam. Typically the catalyst concentration is equivalent to more than about 0.1 by weight of platinum per million parts by weight of foamable composition. Preferably the platinum concentration is between about 5 and 20 parts per million parts of the total composition. Higher catalyst concentrations apparently do not serve any useful purpose unless it is desired to impart flame retardancy to the final foam. The use of 50 ppm or more of platinum as a flame retardant for polyorganosiloxanes is known.

Rhodium-containing catalysts suitable for use in heat curable compositions include those disclosed in U.S. Pat. No. 4,026,835, issued to Lee and Ronk on May 31, 1977, and is incorporated in its entirety by reference thereto. The catalysts described in this patent are complexes containing at least one chlorine atom in addition to a specified group of phosphorous- or sulfur-containing ligands. All of these complexes are known in the art. Rhodium catalysts are typically inactive at conventional temperatures of 25° to 40° C., but promote a rapid hydrosilation reaction at temperatures of about 50° C. and above. These catalysts are preferred for use in one-part, heat-curable foamable compositions that constitute part of the present invention and are typically used at the same concentrations as platinum-containing catalysts.

The foam stabilizer, referred to hereinafter as ingredient (D), maintains the cellular structure of the froth produced by dispensing a foamable composition of this invention from its storage container(s) until the froth has cured sufficiently to become self supporting. In the absence of ingredient (D) the froth usually collapses almost immediately after being generated, and the cured product consists essentially of an elastomer that may contain only a few widely spaced bubbles resulting from entrapped blowing agent.

The foam stabilizers (D) are resinous, benzene-soluble organosiloxane copolymers wherein the repeating units include, but are not limited to, $SiO_{4/2}$ units, $(CH_3)_3SiO_{1/2}$ units and fluorine-containing units comprising at least four perfluorinated carbon atoms. Each of the fluorine-containing units also includes one or two silicon atoms that are bonded to the fluorine-containing carbon atoms by means of carbon atoms and optionally an oxygen atom as described hereinbelow.

The fluorine-containing units of (D) exhibit the formula $R_aR_b'SiO_{(4-a-b)/2}$ or $R''[Si(R')_bO_{(3-b)/2}]_2$. In these formulae R and R'' represent, respectively, monovalent and divalent organic radicals, each of which contains at least four perfluorinated carbon atoms, R' is alkyl containing from 1 to 3 carbon atoms, a is 1 or 2, b is 0, 1 or 2 and the sum of a and b is 3 or less. The free valences of R and R'' are bonded to the silicon atoms of the foregoing formulae by a sequence of at least two methylene, i.e. —$CH_2$— units or by a silicon-bonded oxygen atom that is, in turn, bonded to a sequence of at least two methylene units.

In addition to at least four perfluorinated carbon atoms and at least two nonfluorinated carbon atoms, R and R'' can include partially fluorinated carbon atoms. The carbon atoms of R and R'' can be present in the form of linear chains, branched chains or carboxylic rings. Alternatively, R and R'' can comprise two or more groups of fluorinated carbon atoms or combinations of fluorinated and nonfluorinated carbon atoms. These groups and combinations are connected together either by atoms such as nitrogen, oxygen or sulfur or by divalent groups such as carbonyl, amido, carboalkoxy, and other groups which do not hydrolyze readily, will not cause premature curing of the present foamable compositions during storage and will not substantially inhibit curing of the compositions. R and R'' can contain from 4 to 20 or more carbon atoms, but preferably contain from 4 to 16 carbon atoms.

The relative concentrations of $(CH_3)_3SiO_{1/2}$, fluorinated siloxane units and any additional units other than $SiO_{4/2}$ units and hydroxyl groups must be within certain limits for (D) to function effectively. These limits are most conveniently expressed in terms of their effect on the surface tension of a solution of (D) in a trimethylsiloxy endblocked polydimethylsiloxane and on the solubility of (D) in this medium.

Specifically, a 10% by weight solution of (D) in a trimethylsiloxy endblocked polydimethylsiloxane exhibiting a viscosity of 0.01 Pa.s at 25° C. should exhibit a surface tension of less than $2.2 \times 10^{-4}$ newtons per centimeter at 25° C. Furthermore, at this same concentration level and temperature the solution must either be clear initially or become clear following the addition of not more than 100%, based on the weight of said solution, of xylene.

While not wishing to be bound by any theory, it appears that effective foam stabilizers decrease the surface tension of a foamable composition and exhibit only limited solubility in the composition. The low degree of solubility ensures that at least a portion of the stabilizer will be present at liquid-air interfaces of the cellular structure of the froth formed by the action of the blowing agent on the composition, thereby reducing the surface tension at the liquid-air interfaces and increasing the stability of the froth during the curing reaction. The relatively high viscosity of the present foam stabilizers is believed to impart additional stability to the froth during curing by increasing the elasticity of the cell walls and also reducing the rate at which uncured liquid drains from the foam.

The molar ratio of all units other than hydroxyl and $SiO_{4/2}$ units to $SiO_{4/2}$ units in (D) is from 0.7:1 to 1.1:1, inclusive. Preferably this ratio is from 0.7:1 to 0.9:1, inclusive, to maximize the efficacy of (D) as a foam stabilizer for the preferred formable compositions disclosed in the accompanying examples.

If the foamable compositions contain acidic materials, it is usually desirable to employ foam stabilizers wherein the R and R'' radicals of the foregoing formulae are bonded to silicon through a carbon atom rather than through an oxygen atom. The reason for this preference is that silicon oxygen bonds are apparently more susceptible to cleaving in the presence of acids than silicon carbon bonds. This cleaving appears to destroy or substantially diminish the efficacy of ingredient (D) as a foam stabilizer.

In addition to the silicon-containing units disclosed hereinbefore, (D) typically contains from 0.2 up to about 4.0% by weight of silicon-bonded hydroxyl groups. (D) can optionally contain up to about 10 weight percent of $GSiO_{3/2}$ units, where G represents the residue obtained by removing the hydrogen atom from a hydroxyl group of a hydroxyl containing linear organic polymer. Useful organic polymers include polyalkylene glycols, homopolymers of ethylenically unsaturated alcohols such as allyl and cinnamyl alcohol, copolymers of these alcohols with ethylenically unsaturated hydrocarbons such as styrene. Preferred polymers include styrene/allyl alcohol copolymers and polyethylene glycols.

The presence of $GSiO_{3/2}$ units apparently reduces the solubility of (D) in (A) to a level at which (D) will function more effectively as a stabilizer. The presence of $GSiO_{3/2}$ units is desirable in those instances when the amount of fluorine required to reduce the surface tension of (A) to less than $2.2 \times 10^{-4}$ newtons per centimeter at 25° C. is insufficient to reduce the solubility of (D) in (A) to the extent required for optimum foam stabilization. Because in many instances hydroxyl-containing organic polymers corresponding to the formula GH are considerably less expensive than the fluorine-containing intermediates used to prepare (D), it is usually economically preferable to employ these organic polymers in place of additional fluorine-containing intermediate to decrease the solubility of (D) in (A).

Resinous copolymers corresponding to the foregoing definition of (D) can be prepared using methods previously disclosed for the preparation of similar copolymers. For example, trimethylchlorosilane in combination with (1) a fluorine-containing silane of the formula $R_aR_b'SiCl$ where the sum of a and b is 3, (2) a silane of the formula $R''[Si(R_2)Cl]_2$, or (3) suitable derivatives of either (1) or (2) wherein the chlorine atoms are replaced by other hydrolyzable groups, can be reacted with an aqueous solution of sodium silicate as described by Daudt et al. in U.S. Pat. No. 2,676,182, issued on Apr. 20, 1954. The disclosure of this patent is incorporated herein in its entirety by reference. The reaction of fluorine-containing silanes with sodium silicate is disclosed in U.S. Pat. No. 3,328,349, issued on June 27, 1967 to Lentz and is incorporated herein in its entirety by reference. In accordance with a combination of Lentz's and Daudt et al.'s teaching, an aqueous solution of sodium silicate (e.g. No. 9 sodium silicate sold by E. I. Dupont de Nemours and Co.) is acidified to the proper pH by adding it to a mixture of hydrochloric acid and isopropanol. The resulting acidic silica hydrosol can then be treated with a source of $R_aR_b'SiO_{(4-a-b)/2}$ siloxane units, such as $(R)(CH_3)_2SiOCH_3$ or $(R)(CH_3)_2SiCl$, and a source of $(CH_3)_3SiO_{1/2}$ units, such as $(CH_3)_3SiCl$. These reactants are preferably first dissolved in a mixture of isopropanol and xylene. If chlorosilanes are used, acidification of the sodium silicate may not be required.

After being heated for the time interval required to substantially complete the reaction, the resultant mixture is cooled, whereupon it separates into an aqueous phase, which is discarded, and a nonaqueous phase containing the resinous copolymer. The nonaqueous phase is washed with water to reduce its acid number and remove water-soluble ingredients, such as isopropyl alcohol. Preferably the resinous copolymers prepared by this method are washed with water to remove most, but not all of the acid. The products typically have sufficient acid to provide an acid number of from 0.2 to 2.0.

The fluorinated silanes and siloxanes that can be used to prepare (D) are either known or can be synthesized using known methods. The synthesis of preferred silanes is described in the accompanying examples.

If organic solvents are used as diluents during preparation of a foam stabilizer (D), these are preferably replaced with a trimethylsiloxy endblocked polydimethylsiloxane exhibiting a viscosity of from about 0.001 to about 1 Pa.s at 25° C.

If it is desired to incorporate repeating units of the foregoing $GSiO_{3/2}$ type into the copolymer, this can be accomplished by including the corresponding hydroxyl-containing polymer GH in the reaction mixture together with the fluorinated reactant. Suitable polymers have been discussed hereinbefore.

A second type of foam stabilizer can be prepared using nonfluorinated resinous copolymers of the type described in the aforementioned Daudt et al. patent. These copolymers contain $(CH_3)_3SiO_{1/2}$ and $SiO_{4/2}$ units in addition to from 0.5 to 4.0% weight percent of silicon-bonded hydroxyl groups. The copolymers are reacted with a silane of the formula $R_aR_b'SiY_{(4-a-b)}$ or $Y(R')_2SiR''Si(R')_2Y$, partial hydrolysis products of these silanes or a fluorine-containing alcohol of the formula $F(CF_2)_n(CH_2)_2OH$ where R, R', R'', a and b are defined hereinbefore, Y is a halogen or other hydrolyzable group, and n is an integer from 4 to 20. Most preferably Y is chlorine, based on the availability of the silanes.

In preferred embodiments of (D), R of the foregoing formula represents $F(C_nF_{2n})(CH_2)_2O_c$, R' is methyl, R'' represents $-O_c(CH_2)_2(C_nF_{2n})(CH_2)_2O_c-$, c is 0 or 1, and n is at least 4. Most preferably n is an even integer from 4 to 14 inclusive.

The silanes employed to prepare preferred embodiments of (D) wherein c of the foregoing formulae is 0 exhibit the formulae $F(C_nF_{2n})CH_2CH_2Si(CH_3)_bY_{3-b}$ or $Y_{3-b}(CH_3)_bSiCH_2CH_2(C_nF_{2n})CH_2CH_2Si(CH_3)_bY_{3-b}$ where b is 0, 1 or 2 and Y and n are as defined hereinbefore. These silanes can be prepared by hydrosilation of a fluorinated olefin of the formula $F(CF_2)_nCH=CH_2$ or $CH_2=CH(CF_2)_n CH=CH_2$ with a silane of the formula $(CH_3)_bY_{3-b}SiH$ where Y and n are as defined hereinbefore. The hydrosilation reaction is typically carried out at temperatures of from 150° to 300° C. using as the catalyst an organic peroxide or a platinum-containing material such as chloroplatinic acid. The hydrosilation of fluorinated olefins is disclosed, for example, in U.S. Pat. No. 3,620,992, issued to Kim and Pierce on Nov. 16, 1971 and is incorporated herein in its entirety by reference. Reaction products of fluorinated silanes and the aforementioned resinous copolymers are disclosed in the copending U.S. patent applications of Thomas Lim and Antony Wright, Ser. No. 664,917, and Chi-Long Lee, Thomas Lim and Antony Wright, Ser. No. 664,897, both of which were filed on Oct. 26, 1984.

Alcohols employed to prepare preferred stabilizers wherein c of the foregoing formula is 1, exhibit the formula $F(CF_2)_nCH_2CH_2OH$. One example of this class of alcohols is commercially available as a mixture of homologs wherein the value of n is 4, 6, 8, 10 and 12. Preferred foam stabilizers of this type are disclosed and claimed in U.S. patent application Ser. No. 664,598, filed in the name of Joseph W. Keil on Oct. 26, 1984.

A reaction between a fluorine-containing alcohol and a resinous copolymer containing $(CH_3)_3SiO_{1/2}$ and $SiO_{4/2}$ units can be conducted by dissolving the two reactants in a suitable solvent and heating the resultant solution in the presence of a catalyst for condensation reactions of silicon-bonded hydroxyl groups while removing the water generated as a by-product of the reaction. Catalysts for this type of reaction include alkali metal hydroxides, organosulfonic acids and organic or inorganic tin compounds such as stannous octoate and dibutyltin dilaurate. The reaction is preferably conducted at the boiling point of the reaction medium, which is typically a liquid hydrocarbon that forms an azeotrope with the by-product water. Other organic solvents such as ketones can be included to increase the solubility of the reactants in the reaction medium.

The foam stabilizer (D) typically constitutes from 0.2 to about 25% by weight of the present foamable compositions. This value is preferably from 1 to 10% by weight. The minimum concentration of (D) that will adequately maintain the structure of the initially produced liquid froth during curing is a function of several variables, including viscosity of the foamable composition, the rate at which the composition cures and the fluorine content of (D). As the fluorine content of (D) increases, it becomes less compatible with the other ingredients of the present foamable compositions, and is more likely to migrate to the surface of the bubbles that constitute the froth formed when the composition is dispensed from the pressurized container in which it is stored. The optimum concentration value for (D) will be within the 0.2 to 25 weight % range that characterizes the present compositions.

Moisture curable polyorganosiloxane compositions that include a liquified blowing agent and preferred embodiments of the foam stabilizer (D) are disclosed in copending U.S. patent application Ser. No. 665,272, filed on Oct. 26, 1984 in the names of Chi-Long Lee and James A. Rabe. The present compositions differ from the ones disclosed in this copending application in that the present compositions are curable by a platinum- or rhodium-catalyzed hydrosilation reaction that does not require atmospheric moisture.

The foamable polyorganosiloxane compositions of this invention are converted to foams by the action of a blowing agent, referred to hereinafter as (E). The blowing agent is packaged in a pressure-resistant container such as an aerosol can. When the blowing agent is combined with the other ingredients of the present compositions under atmospheric pressure, the composition is converted to a froth that cures to a solid, elastomeric foam at room temperature if ingredient (C) is a platinum-containing catalyst in the absence of an inhibitor. If ingredient (C) is either a rhodium-containing catalyst or a platinum-containing catalyst in the presence of ingredient (F), the froth has to be heated to cure into a solid, elastomeric foam.

Ingredient (E) can be any material that is a gas at 25° C. under atmospheric pressure, can be compressed or liquified under moderate pressures and is unreactive with the other ingredients of the present compositions. Suitable liquifiable blowing agents include aliphatic hydrocarbons containing three or four carbon atoms, dimethylether, fluorocarbons and the various chlorofluoromethanes. Isobutane is particularly preferred on the basis of its cost and availability. Fluorocarbons and chlorofluoromethanes have been considered undesirable for ecological reasons in the United States. Compressible gases such as air and nitrogen are also suitable blowing agents.

Ingredient (E) can constitute from about 4 to about 85% of the total weight of the present foamable compositions. The optimum concentration range is dependent upon a number of variables, the most influential of which appears to be the viscosity of the foamable composition, which is, in turn, dependent to a large extent upon the viscosity of (A) and the amount of any silica or other filler(s) present.

The optimum concentration of (E) is one that will provide the best balance between stability of the froth during curing, a sufficiently rapid discharge rate of the composition from the aerosol can(s) or other pressurized container(s) in which it is stored and the desire to achieve a low density in the cured foam.

Too high a concentration of blowing agent may destroy the cellular structure of the initial froth. Too low a concentration will yield a high density foam and decrease the maximum rate at which the ingredients of the present composition that are stored together with the blowing agent can be dispensed from a pressurized container.

When ingredients (A) and (B) are mixed with a platinum-containing catalyst the mixture will cure immediately at room temperature. To avoid this premature curing during storage, ingredients (A) and (B) have to be stored in separate containers (aerosol cans) or in separate compartments of a two-compartment aerosol can. Ingredient (C) can be incorporated together with either ingredient (A) or ingredient (B). Ingredient (D) can be incorporated in either ingredient (A) or/and ingredient (B). The resultant product is a two-part composition. To produce a satisfactory cured foam, the two parts of the composition must be combined in a specified volume ratio. This ratio is conveniently 1:1.

Premature curing of a one-part composition can be avoided by addition of an inhibitor, referred to hereinafter as ingredient (F) in an amount such that the resultant mixture becomes stable at temperatures below about 60° C.

The inhibitor should not adversely affect the ability of the catalyst to promote curing at temperatures of 50° C. and above.

One suitable type of platinum catalyst inhibitor is described in U.S. Pat. No. 3,445,420, issued to Kookootsedes et al. on May 20, 1969 and is hereby incorporated by reference to show certain acetylenic inhibitors and their use. A preferred class of acetylenic inhibitors are the acetylenic alcohols, especially 2-methyl-3-butyn-2-ol.

An optimum inhibitor concentration will provide the desired storage stability without excessively prolonging the time interval required to cure the compositions at temperatures of 50° C. and above. This amount will vary widely, depending upon the particular inhibitor selected, the type and concentration of the platinum-containing catalyst and the composition of ingredients (A) and (B).

Inhibitor concentrations as low as one mole of inhibitor per mole of platinum will in some instances yield a satisfactory level of storage stability and desirably short curing period. In other cases, inhibitor concentrations of up to 500 or more moles per mole of platinum may be needed. The optimum concentration for a particular inhibitor in a given composition can be determined by routine experimentation.

No inhibitor is required using rhodium-containing hydrosilation catalysts, which typically function only at temperatures above about 50° C.

Using of one of the rhodium or inhibited platinum catalysts described hereinbefore, all of the ingredients of a foamable composition can be packaged in a single pressure resistant container such as an aerosol can and stored at temperatures up to 50° C. until such time as it is desired to prepare a foam, at which time the ingredients are discharged into an area under atmospheric pressure. At temperatures above about 0° C., the blowing agent volatilizes within the composition to form a cellular foam structure that is maintained by the foam stabilizer (D) until the foam is cured by heating it to a temperature that is sufficiently high to activate the inhibited catalyst. Typically this temperature is at least 50° C. Heating of the foam can be accomplished by placing it in or passing it through a heated chamber such as an oven or by exposing the foam to infra-red radiation.

A preferred curing method involves exposing the foam to microwave energy. Such a method is most effective when a microwave sensitive material is incorporated into the foamable composition. These microwave-sensitive materials are referred to hereinbefore as optional ingredient (G). Any of the known microwave-sensitive materials can be used, so long as they do not cause premature curing of the composition or adversely affect the ability of the composition to cure at elevated temperatures. The ability of materials to convert the energy present in electromagnetic waves into heat is directly proportional to their loss factor, referred to as "tan delta" in the art. Materials with relatively high loss factors include hydroxyl-containing organic compounds such as methanol, ethylene glycol and glycerol. Carbon black, calcium carbonate and metal oxides such as ferric oxide are also classified as microwave sensitive materials.

Organic microwave sensitive materials include copolymers containing organosiloxane units and units derived from the polymerization of organic compounds with polar groups such as carboxyl. A preferred class of copolymers are prepared by the peroxide catalyzed polymerization of ethylenically unsaturated polar organic compounds in the presence of hydroxyl endblocked polydimethylsiloxanes. Useful organic monomers include esters of acrylic and methacrylic acids. U.S. Pat. No. 4,011,197, issued to Lee on Mar. 8, 1977, discloses a method for curing non-cellular organosiloxane compositions using the heat generated by exposing the compositions to microwave energy. The organosiloxane compositions contain a minimum of about 5 weight % of at least one member of a specified group of hydrocarbon radicals that includes halogen-, sulfur-, and oxygen-containing hydrocarbon radicals and aryl radicals.

The use of microwave radiation to generate the heat required to activate an inhibited platinum catalyst in a foamable composition comprising a polyorganosiloxane gum stock, an organohydrogensiloxane and a source of hydroxyl groups is disclosed in U.S. Pat. No. 4,026,844, issued to Kittle and Ronk on May 31, 1977. These compositions are based on gum stocks exhibiting a Williams plasticity value greater than 0.076 cm.

The concentration of microwave-sensitive material present in a foamable composition will depend upon the desired curing temperature and the loss factor of the particular microwave-sensitive material being used. Typically, ingredient (G) constitutes from 0.5 to 60 percent by weight of foamable composition of this invention. Preferably the range is from 5 to 45 percent by weight.

In addition to the aforementioned ingredients (A)–(F), the present foamable compositions can contain reinforcing or nonreinforcing fillers, pigments, flame retardants, antioxidants and other additives conventionally used in polyorganosiloxane compositions. These additives must not adversely affect curing of the foam or the action of the foam stabilizer (D) to any appreciable extent.

The foamable compositions of this invention can optionally contain up to 50% by weight, based on the total weight of the composition, of finely divided fillers such as silica that are conventionally employed in RTV polyorganosiloxane compositions.

Fume silicas are preferably used at concentrations of from 10 to 20%, based on the weight of the foamable composition.

Finely divided silica fillers are typically treated with relatively low molecular weight, liquid hydroxyl containing organic or organosilicon compounds to prevent a phenomenon referred to in the art as "crepe-hardening" of polyorganosiloxane compositions. The filler particles can be treated before being added to the composition or the particles can be treated "in situ" by having a suitable treating material present as an ingredient in the compositions. Known filler treating agents include hydroxyl-containing silanes and polydiorganosiloxanes where the hydrocarbon groups present on silicon are lower alkyl such as methyl, and can also include phenyl, vinyl and 3,3,3-trifluoropropyl.

Other useful fillers include chopped and flocked glass fibers and flame blown glass microfibers. The glass fibers are preferably less than about 8 mm long and less than about $5 \times 10^{-3}$ mm in diameter Larger diameter fibers can be used, but are not as effective in modifying the flow properties of the foamable composition as the preferred fibers. The larger fibers may also interfere with dispensing of the composition through conventional aerosol valves by clogging passages within the valve.

If a black or grey foam is acceptable, up to about 30% by weight, based on the foamable composition, of carbon black can be added in place of or in combination with glass or other types of fibers.

Compositions containing silica in combination with glass fibers and/or carbon black will be nonslumping when used in combination with liquified blowing agents such as isobutane or chlorinated fluorocarbons such as trifluorochloromethane. A nonslumping composition will not flow appreciably when dispensed onto a vertical or a sloping surface. This characteristic is very desirable if the present compositions are used to fill joints or other open spaces in a vertical member such as a wall, or in the lower surface of a horizontally oriented member such as the ceiling of a building or other structure.

In the absence of one of the aforementioned optional catalyst inhibitors (Ingredient F), compositions containing a platinum catalyst usually begin to cure when ingredients (A), (B) and (C) are combined. Compositions containing an uninhibited platinum catalyst must be stored in a manner that avoids contact between the organohydrogensiloxane (B) and the catalyst (C) until it is desired to react (A) and (B) and prepare a foam. So long as (B) and (C) are not present in the same mixture, the ingredients of foamable compositions that include an uninhibited platinum hydrosilation catalyst can be combined and stored for extended periods of time in two or more parts. At the time a foam is to be formed the various parts of the composition are combined in the proper proportions, blended and discharged into an area under atmospheric pressure. As disclosed hereinbefore, the relative amounts of (A) and (B) should be equivalent to from 1 to 3 silicon-bonded hydrogen atoms in (B) per vinyl radical in (A). If any other material containing vinyl or other ethylenically unsaturated hydrocarbon radical or hydroxyl groups is present in the foamable composition, the concentration of (B) must be increased to provide a sufficient number of silicon-bonded hydrogen atoms to react with these ethylenically unsaturated radicals and hydroxyl groups.

In accordance with a preferred method for packaging a two-part foamable composition of this invention, at least a portion of ingredient (A), the diorganovinylsiloxy endblocked polydimethylsiloxane, is combined with ingredient (B), the organohydrogensiloxane and the foam stabilizer (D). The remainder of ingredient (A) can be combined with the catalyst (C) and foam stabilizer (D).

The blowing agent can be present in one or both of the aforementioned portions or it can be added when the other ingredients of the present composition are combined to form a foam. Because the blowing agent (E) is a gas at temperatures above 0° C. under atmospheric pressure, any combination of ingredients that includes (E) should be stored in a closed, pressure-resistant container. Preferably the two portions of the present composition are each packaged together with blowing agent in pressurized containers such as aerosol cans. In this instance the blowing agent also acts as a propellant to expel each part of the composition from the container in which it is stored. In a preferred dispensing system both containers are equipped with suitable aerosol type valves which discharge into a common conduit that preferably incorporates a means for homogeneously blending the contents of the two containers prior to discharging the resultant mixture as a froth into an area under atmospheric pressure. The ingredients of the composition can be blended using various means that have been disclosed in the prior art. A preferred means comprises a static mixer consisting of a tube having baffles arranged along the interior surface that generate the turbulence required to achieve adequate mixing of materials passing through the tube.

Methods and equipment for packaging compositions containing volatile materials into pressure-resistant containers are well known in the art and do not form part of this invention.

Alternatively, two-part compositions can be packaged in a two-compartment container equipped with a codispensing valve having access to both compartments of the container. Valves of this type are commercially available.

If the composition is very viscous and/or contains a filler that impedes flow of the composition through the valve of the pressurized container, it may be desirable to package the compositions in a two-compartment can wherein only one compartment is equipped with a valve and contains at least a portion of the foamable composition, including the blowing agent. The second compartment is separated from the first by means of a piston or a flexible wall and contains a propellant that can be of the same composition as the blowing agent or can be a more volatile material. The propellant provides the additional pressure required to increase the rate at which the foamable composition can be dispensed from the pressurized container. Two-compartment aerosol cans are known in the art and can be equipped with any of the known types of aerosol valves and spray heads.

All other conditions being equal, the maximum rate at which a foamable composition of this invention can be dispensed from a pressurized container and the rate at which liquid materials will drain during curing of the foam are both inversely proportional to the viscosity of the foamable composition. To obtain useful foams the viscosity of the composition should be at least 0.5 Pa.s at 25° C. The optimum combination of a relatively rapid dispensing rate and stability of the resultant cellular structure during curing is achieved without an excessive amount of blowing agent when the viscosity of the foamable composition is from 1 to 100 pa.s at 25° C.

If it is desired to prepare foams on a large scale without the necessity of storing combinations of ingredients, ingredients (A), (B), (C), (D) and, optionally, (F) together with any additional ingredients other than the blowing agent are dispensed from their individual containers and the liquified blowing agent (E) is dispensed from a pressurized container. The ingredients are blended in a suitable pressurizable mixing head and the resultant foam is dispensed at the outlet of the mixing head.

Foams prepared from one-part foamable compositions containing a microwave sensitive material are cured by exposing them to a source of microwave radiation, which is typically above a frequency of 1000 MHz. The duration of the exposure is dependent upon the type of microwave-sensitive material and the intensity of the radiation absorbed by the composition. Typically a foam can be cured in from 5 to 20 minutes. Microwave radiation can completely penetrate the foamed composition, thereby making it possible to cure the interior portion of thick foams relatively quickly.

The use of microwave radiation makes possible the dispensing and curing of foamable compositions in areas where conventional heating means such as electric or gas fired ovens are not practical. Unlike conventional heating means, the microwave source does not become heated and can be readily transferred or handled once supplying of electrical power to the source is discontinued.

A variety of microwave generators are known, and many are commercially available. A preferred generator is a microwave oven of the type conventionally used for food preparation.

The foam stabilizer (D) will maintain the cellular structure of the resultant uncured froth, however it usually cannot entirely stop the drainage of liquid material and the gradual collapse of the froth. It is therefore recommended that microwave curable foamable compositions be cured as soon as possible after being dispensed.

The foams generated using the present foamable compositions are of the closed cell type and useful in numerous applications, including insulation, packaging material and as caulking material to fill gaps and conduits in buildings and transportation vehicles. The density of the foams is within the range from 0.1 to 0.5 g/cm$^3$, making them more economical than conventional noncellular polyorganosiloxane compositions typically used as sealants. The size of the cells is within the range of from less than 0.5 mm up to 5 mm.

The following examples disclose preferred foamable compositions that are within the scope of the accompanying claims, and should not be interpreted as limiting the scope thereof. All parts and percentages are by weight unless otherwise specified.

EXAMPLE 1

This example demonstrates formation of a microwave curable foam using a one-part composition of this invention containing calcium carbonate as the microwave-sensitive material.

The foam stabilizer (D) used in this example and Example 2 was prepared by the reaction of a resinous organosiloxane copolymer with a fluorinated alcohol.

A glass reactor equipped with a thermometer, reflux condenser, mechanically driven stirrer and Dean-Stark apparatus to retain a portion of the condensate returning to the reactor, was charged with 60.5 parts of a 74.4% solution in xylene of a resinous organosiloxane copolymer, 5.0 parts of a mixture of homologous fluoroalcohols having the average formula $F(CF_2)_8CH_2CH_2OH$ and available as Zonyl® BA Fluoroalcohol, 34.3 parts of xylene and 0.25 part of a 1 N solution of potassium hydroxide in ethanol. The organosiloxane copolymer consisted essentially of repeating units of the formulae $(CH_3)_3SiO_{1/2}$ and $SiO_{4/2}$ in a molar ratio of about 0.75:1.0, respectively and contained about 2.5% by weight of silicon-bonded hydroxyl groups. The copolymer is described in the aforementioned U.S. Pat. No. 2,676,182 to Daudt et al.

The contents of the reactor were heated at the boiling point for 1½ hours, then cooled to 50° C. and neutralized to a pH of about 7 by bubbling carbon dioxide through the reaction mixture. The resultant mixture was then combined with 50 parts of a trimethylsiloxy endblocked polydimethylsiloxane exhibiting a viscosity of 0.01 Pa.s and the volatile materials were then evaporated under reduced pressure. The resultant clear solution exhibited a surface tension of $1.92 \times 10^{-4}$ newtons/cm.

A microwave curable, foamable composition of this invention was prepared by blending together equal weights of calcium carbonate and a dimethylvinylsiloxy endblocked polydimethylsiloxane exhibiting a viscosity of about 0.4 Pa.s at 25° C. One hundred parts of the resultant mixture was placed in an aerosol can, followed by 2.06 parts of a trimethylsiloxy endblocked dimethylsiloxane/methylhydrogen-siloxane copolymer containing 0.8 percent by weight of silicon-bonded hydrogen atoms, 2.63 parts of the foam stabilizer prepared as described in the first part of this Example and 0.5 part 2-methyl-3-butyn-2-ol as the catalyst inhibitor. The resultant mixture was thoroughly blended, at which time there was added 0.19 part of a chloroplatinic acid complex of symmetrical tetramethyldivinyldisiloxane diluted with sufficient liquid dimethylvinylsiloxy endblocked polydimethylsiloxane to achieve a platinum content of about 0.7 weight percent. The cover and valve assembly of the aerosol can were then secured in position and 9 parts of isobutane was added through the valve. A foam-type spray head was then placed over the valve and the container was shaken by hand to evenly distribute the isobutane throughout the composition.

A portion of the contents of the aerosol can was dispensed into a square container measuring $5 \times 5$ cm to yield a foam having a height of about 1.8 cm. The container was then placed in a microwave oven (Magic Chef Model No. MW3172-5P) and exposed to microwave radiation at a frequency of 2450 Mkz. for ten minutes with the intensity control at the "high" setting. The resultant white foam exhibited a smooth, non-tacky surface and a density of 0.37 g/cc. The cells ranged in diameter from 0.5 to 5 mm and all appeared to be closed.

The foam could not be ignited when contacted with the flame of a match.

EXAMPLE 2

This example demonstrates formation of a foam using glycerine or powdered aluminum as the microwave-sensitive material.

A first foamable composition was prepared by packaging the following ingredients in an aerosol can.
50 parts of the dimethylvinylsiloxy endblocked polydimethylsiloxane of Example 1,
2.06 parts of the dimethylsiloxane/methyl hydrogensiloxane copolymer of Example 1,
2.71 parts of the foam stabilizer described in Example 1
0.05 part 2-methyl-3-butyn-2-ol,
5.08 parts glycerine, and
0.2 part of the chloroplatinic acid complex of Example 1, and
7.2 parts of isobutane.

A foam was dispensed and cured as described in Example 1, with the exception that the residence time in the microwave oven was seven minutes. Samples of the resultant cured foam exhibited densities of from 0.08 to 0.17 g. per cc.

A second foamable composition was prepared using the same types and amounts of polydimethylsiloxane and dimethylsiloxane/methylhydrogensiloxane copolymer, and the same amounts of isobutane, 2-methyl-3-butyn-2-ol, and chloroplatinic acid complex as in the first composition. The second composition also contained 2.78 parts of the same foam stabilizer as the first composition and 5.0 parts powdered aluminum in place of the glycerine as a microwave sensitive material.

The second composition was packaged in an aerosol can and dispensed as a foam. The foam was cured as described in the foregoing Example 1 using a residence time in the microwave oven of seven minutes. The resultant closed cell cured foam exhibited a density of 0.10 g/cc and a cell size range of from 0.2 to 1.5 mm.

EXAMPLE 3

Part I of a two-part foamable composition of this invention was prepared by blending to homogenity the following ingredients:
19 parts of a dimethylvinylsiloxy endblocked polydimethylsiloxane ($A^1$) exhibiting a viscosity of 0.4 Pa.s at 25° C.;
12 parts of a dimethylviuylsiloxy endblocked polydimethylsiloxane ($A^2$) exhibiting a viscosity of about 30 Pa.s at 25° C.;
1.7 parts of a foam stabilizer prepared using the organosiloxane copolymer and fluoroalcohol composition described in Example 1 and the procedure described hereinbelow. In this instance the weight ratio of copolymer to fluoroalcohol composition was 4:1 respectively;
6.5 parts of finely divided quartz having an average particle size of 5 microns, and
0.34 part of a liquid catalyst composition prepared by reacting 3.6 parts of chloroplatinic acid hexahydrate with 200 Parts of an oligomeric dimethylvinylsiloxy endblocked polydimethylsiloxane having an average of five dimethylsiloxane units per molecule. After heating for 3.5 hours at 70° C. the resultant mixture was combined with 40 parts sodium bicarbonate and 200 parts of water and heated for 2 hours at a temperature of 60° C. The platinum content of the filtered liquid reaction product was 0.66% by weight.

Part II of the foamable composition was prepared by combining together the following ingredients to form a homogeneous composition.
17 parts of polydimethylsiloxane $A^1$ described hereinabove,
12 parts of polydimethylsiloxane $A^2$ described hereinabove,
1.7 parts of the foam stabilizer of part I,
6.5 parts of the finely divided quartz present in Part I, and 1.33 parts of a trimethylsiloxy endblocked copolymer containing 37.5 mole percent dimethylsiloxane units and 62.5 mole percent methylhydrogensiloxane units. The content of silicon-bonded hydrogen atoms in the copolymer was between 0.7 and 0.8 percent by weight.

The foam stabilizer wa prepared by adding 20 parts of the molten fluoroalcohol described in Example 1 to 80 parts of the copolymer described in Example 1 as a 50% solution in xylene, followed by the addition of one part of a 1N ethanolic solution of potassium hydroxide. The resultant mixture was then heated at 120°–130° C. for about 2.5 hours, at which time it was allowed to cool. Solid carbon dioxide was then added to neutralize the basic materials present in the reaction mixture. The mixture was then combined with 100 parts of a trimethylsiloxy endblocked polydimethylsiloxane exhibiting a viscosity of 0.01 Pa.s at 25° C. The xylene and other volatile materials were then removed by heating the reaction mixture under reduced pressure.

The foam stabilizer contained $(CH_3)_3SiO_{1/2}$ and $SiO_{4/2}$ units, silicon-bonded hydroxyl groups and fluorinated siloxane units of the formula $F(CF_2)_nCH_2CH_2OSiO_{3/2}$—where the average value of n is 8. The molar ratio of all units in the foam stabilizer with the exception of hydroxyl groups and $SiO_{4/2}$ units, to said $SiO_{4/2}$ units were from 0.7:1 to 1:1, inclusive, a 10% by weight solution of the foam stabilizer in a trimethylsiloxy polydimethylsiloxane exhibiting a viscosity of 0.01 Pa.s at 25° C. was clear and exhibited a surface tension of less than $2.2 \times 10^{-4}$ newton per cm at 25° C.

Compositions I and II were placed in two supply tanks of a commercial foam machine (Model 2100-354 manufactured by Sealants Equipment and Engineering, Inc., Oak Park, Mich.). The blowing agent was a mixture of 60% by volume of dichlorodifluoromethane and 40% by volume of trichlorofluoromethane. This mixture was supplied to the nucleating air port of the foam machine by means of a metering pump and a pressure relief valve that was set at 6900 kilopascals.

The pumps of the supply tanks containing Parts I and 11 of the foamable composition were adjusted to deliver equal volumes of each part to the foam machine at a rate of 830 g per minute. Three different metering pump settings were used. The calculated amounts of blowing agent delivered to the foam machine were 0.175 cc per 9ram combined Parts I and II, 0.22 cc per gram of combined Parts I and II and 0.33 cc per gram of combined Parts I and II. The calculated amounts of blowing agent were based on a previously obtained calibration curve for the metering pump.

When an equilibrium condition had been established, as evidenced by a foam of consistent quality, the foams obtained using the three aforementioned gas pump settings were collected individually in 947 cc capacity containers. The foams were allowed to stand for about 45 minutes, after which the interior of each form was examined and the density measured. This information is summarized in the following table.

| Sample Number | cc Blowing Agent per g. of Pts. I & II | Foam Density (g/cc) | Foam Appearance |
|---|---|---|---|
| 1 | 0.175 | 0.47 | Majority of cells smaller than 0.5 mm in diameter. |
| 2 | 0.22 | 0.41 | Scattered cells were 2–5 mm in diameter Majority of cells smaller than 0.5 mm, others 0.5–1 mm in diameter and larger percentage of 2–5 mm cells than in Sample 1 |
| 3 | 0.33 | 0.27 | Majority of cells 0.5–1 mm in diameter, approximately as many 2–5 mm diameter cells as in Sample 2 |

The foregoing data demonstrate the effect of blowing agent concentration on the cell size distribution and density in the final foam. All of the foams cured within 5 minutes after being sprayed.

EXAMPLE 4

This example demonstrates the use of (1) a catalyst prepared using a fluorinated siloxane and (2) an organohydrogensiloxane of the formula $[H(CH_3)_2SiO]_4Si$ in a two-part foamable composition of this invention.

Part I' of the two-part composition was prepared by blending the following ingredients to homogeneity:

30 parts of a dimethylvinylsiloxy endblocked polydimethylsiloxane exhibiting a viscosity of 2.1 Pa.s at 25° C., 1.7 parts of a foam stabilizer prepared as described in the preceding Example 3, and 0.14 part of a platinum-containing catalyst (C) obtained by reacting 55.5 parts of a dimethylvinylsiloxy endblocked poly(methyl-3,3,3-trifluoropropylsiloxane) containing an average of three fluorinated siloxane units per molecule with one part of chloroplatininc acid hexahydrate at a temperature of 70° C. for three hours. Three parts of solid sodium bicarbonate were then added to the reaction mixture to neutralize acidic by-products, followed by a volume of a saturated aqueous sodium bicarbonate solution equal to about half the volume of the reaction mixture. The non-aqueous layer was then isolated, washed three times with distilled water and then dried using anhydrous calcium sulfate. The product contained 0.73% platinum. It was combined with a second reaction product prepared using the same method and containing 0.3% platinum. The resultant mixture contained 0.52% platinum and was used as catalyst (C).

Part II' of the composition was prepared by homogeneously blending:

30 parts of the polydimethylsiloxane used to prepare Part I' of this example, 0.6 parts of $[H(CH_3)_2SiO]_4Si$, and 1.7 parts of the foam stabilizer used in Part I'.

Parts I' and II' were packaged individually into conventional one-compartment aerosol cans together with 7.2 parts of isobutane as the blowing agent. The valves of the cans were connected to a common conduit that terminated in a static mixer consisting of a tube having a network of baffles by means of which parts I' and II' were thoroughly blended before exiting from the conduit.

When the valve stems of both aerosol cans were depressed substantially simultaneously a liquid foam emerged from the open end of the conduit. The foam cured in two minutes at room temperature with substantially no drainage of liquid material to yield a solid foam exhibiting a density of 0.32 g/cc and a cell size range of from 0.1 to 0.5 mm.

For comparative purposes a composition composed of Parts I″ and II″ was prepared using the same ingredients as Parts I′ and II′, respectively, of this example, except that the foam stabilizer was omitted. The amounts of polydimethylsiloxane, organohydrogensiloxane and isobutane were identical to those in Parts I′ and II′ and the amount of catalyst was increased from 0.14 part to 0.28 part. Parts I″ and II″ were packaged in aerosol cans and dispensed as described in the first part of this example. Because it did not contain any foam stabilizer, the foam collapsed immediately after being dispensed. The cured product was a solid rubber containing a few bubbles that measured from 2 to 5 mm in diameter.

That which is claimed is:

1. A foamable polyorganosiloxane composition exhibiting a viscosity of at least 0.5 Pa.s at 25° C., said composition consisting essentially of the product obtained by homogeneously blending together
    (A) a polydimethylsiloxane containing at least two vinyl radicals per molecule and exhibiting a viscosity of from 0.1 to 100 Pa.s at 25° C.;
    (B) an organohydrogensiloxane containing an average of at least 3 silicon-bonded hydrogen atoms per molecule in an amount sufficient to cure said composition in the presence of a hydrosilation catalyst;
    (C) a catalytically effective amount of a platinum-containing hydrosilation catalyst,
    (D) from 0.2 to 25%, based on the weight of said polyorganosiloxane composition, of a foam stabilizer consisting essentially of a resinous, benzene-soluble organosiloxane copolymer comprising $SiO_{4/2}$ units, $(CH_3)_3SiO_{1/2}$ units and fluorine-containing units selected from the group consisting of $R_aR_b'SiO_{(4-a-b)/2'}$, $R''[Si(R')_bO_{(3-b)/2}]_2$ and combinations thereof, where R is a monovalent organic radical containing at least four perfluorinated carbon atoms, R′ is an alkyl radical containing from 1 to 3 carbon atoms, R″ is a divalent organic radical containing at least four perfluorinated carbon atoms, R and R″ are bonded to the silicon atoms of their respective fluorine-containing units by means of a sequence of at least two methylene radicals or a silicon-bonded oxygen atom that is, in turn, bonded to a sequence of at least two methylene radicals, a is 1 or 2, b is 0, 1 or 2 and the sum of a and b is 3 or less, the molar ratio of all units other than hydroxyl and said $SiO_{4/2}$ units to said $SiO_{4/2}$ is from 0.7:1 to 1.1:1 inclusive, and the molar ratio of the $(CH_3)_3SiO_{1/2}$ units with respect to said fluorine-containing units and any remaining units other than said $SiO_{4/2}$ units is such that
        (a) the surface tension exhibited by a 10% by weight solution of (D) in a trimethylsiloxy endblocked polydimethylsiloxane exhibiting a viscosity of 0.01 Pa.s at 25° C. is less than $2.2 \times 10^{-4}$ newtons per cm at 25° C., and
        (b) said 10% by weight solution requires the addition of from 0 to 5 weight % of xylene to achieve clarity at 25° C. and;
    (E) an amount of a blowing agent sufficient to convert said composition to a foam during exposure of said composition to atmospheric pressure and a temperature of at least 0° C.

2. A composition according to claim 1 where the organohydrogensiloxane (B) is selected from the group consisting of polymethylhydrogensiloxanes, dimethylsiloxane-methylhydrogensiloxane copolymers, and $[H(CH_3)_2SiO]_4Si$.

3. A composition according to claim 1 wherein the hydrosilation catalyst (C) is a reaction product of chloroplatinic acid with a vinyl-terminated polydiorganosiloxane of the general formula $(CH_2=CH)R_2'''Si[OSi(CH_3)(R''')]_x-OSiR_2'''(CH=CH_2)$, where each R‴ is individually selected from the group consisting of alkyl radicals containing from 1 to 4 carbon atoms, phenyl radicals and 3,3,3-trifluoropropyl radicals, and x represents an integer from 1 to 6, inclusive.

4. A composition according to claim 1 where the optional microwave-sensitive material (G) is present and the hydrosilation catalyst (C) is a rhodium compound.

5. A composition according to claim 1 where said blowing agent (E) is selected from the group consisting of an aliphatic hydrocarbon containing three or four carbon atoms, dimethyl ether, a fluorocarbon and a chlorofluoromethane.

6. A composition according to claim 5 where said blowing agent is isobutane.

7. A composition according to claim 1 where the fluorine-containing units of (D) are of the formula $R_aR_b'SiO_{(4-a-b)/2}$ where R is $F(CF_2)_n(CH_2)_2O_c$; R′ is methyl; a is 1; b is 0, 1 or 2; c is 0 or 1 and n represents at least one even integer from 4 to 16, inclusive.

8. A composition according to claim 7 where b is 0 and (D) is the reaction product of an organosiloxane copolymer consisting essentially of $(CH_3)_3SiO_{1/2}$ units, $SiO_{4/2}$ units and from 0.5 to about 4.0% by weight of silicon-bonded hydroxyl groups with a silane of the formula $[F(C_nF_{2n}(CH_2)_2](CH_3)_bSiCl_{3-b}$ where b is 1 or 2.

9. A composition according to claim 7 where b is 0, c is 1 and (D) is the reaction product of a mixture comprising an organosiloxane copolymer consisting essentially of $(CH_3)_3SiO_{1/2}$ units, $SiO_{4/2}$ units and from 0.5 to about 4.0% by weight of silicon-bonded hydroxyl groups with a fluorine-containing alcohol of the formula $F(CF_2)_n(CH_2)_2OH$.

10. A composition according to claim 9 where (D) contains up to 10%, based on the weight of (D), of $GSiO_{3/2}$ units, where G represents the residue obtained by removal of a hydrogen atom from the hydroxyl group of a hydroxyl-containing organic polymer.

11. A composition according to claim 10 where said hydroxyl-containing organic polymer is selected from the group consisting of polyalkylene glycols, homopolymers of ethylenically unsaturated alcohols, and copolymers of said alcohols with ethylenically unsaturated hydrocarbons.

12. A composition according to claim 11 where said hydroxyl-containing organic copolymer is a styrene/allyl alcohol copolymer.

13. A composition according to claim 1 where (D) constitutes from 1 to 10% of the weight of said composition.

14. A polyorganosiloxane foam prepared by dispensing the composition of claim 1 from at least one pressurized container wherein said composition is storage stable into an area under atmospheric pressure and a temperature of at least 25° C., and wherein the density of the cured foam is from 0.1 to 0.5 g/cc and the cell size is within the range of from less than 0.5 mm to 5.0 mm.

15. A foam according to claim 14 wherein the foam is allowed to cure under ambient conditions.

* * * * *

UNITED STATES PATENT AND TRADEMARK OFFICE
CERTIFICATE OF CORRECTION

PATENT NO. : 4,555,529

DATED : 11-26-85

INVENTOR(S) : Chi-Long Lee, Myron T. Maxson, James A. Rabe

It is certified that error appears in the above-identified patent and that said Letters Patent is hereby corrected as shown below:

Column 17, line 48 - Delete "9 ram" and substitute -- gram -- .

Column 17, line 43 - Delete "ll" and substitute -- II -- .

Signed and Sealed this

Twenty-fourth Day of March, 1987

Attest:

DONALD J. QUIGG

*Attesting Officer*  *Commissioner of Patents and Trademarks*